(12) United States Patent
Durham et al.

(10) Patent No.: US 11,568,211 B2
(45) Date of Patent: Jan. 31, 2023

(54) DEFENDING NEURAL NETWORKS BY RANDOMIZING MODEL WEIGHTS

(71) Applicant: Intel Corporation, Santa Clara, CA (US)

(72) Inventors: David Durham, Beaverton, OR (US); Michael Kounavis, Portland, OR (US); Oleg Pogorelik, Lapid (IL); Alex Nayshtut, Gan Yavne (IL); Omer Ben-Shalom, Rishon le-Tzion (IL); Antonios Papadimitriou, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1070 days.

(21) Appl. No.: 16/233,700

(22) Filed: Dec. 27, 2018

(65) Prior Publication Data
US 2019/0156183 A1 May 23, 2019

(51) Int. Cl.
| | |
|---|---|
| *G06N 3/04* | (2006.01) |
| *G06N 3/063* | (2006.01) |
| *G06F 7/58* | (2006.01) |
| *G06F 17/18* | (2006.01) |
| *G06N 3/08* | (2006.01) |

(52) U.S. Cl.
CPC .......... *G06N 3/0472* (2013.01); *G06F 7/588* (2013.01); *G06F 17/18* (2013.01); *G06N 3/063* (2013.01); *G06N 3/08* (2013.01); *G06F 7/58* (2013.01)

(58) Field of Classification Search
CPC ........ G06N 3/0472; G06N 3/063; G06N 3/08; G06F 7/588; G06F 17/18
See application file for complete search history.

(56) References Cited

U.S. PATENT DOCUMENTS

| | | | |
|---|---|---|---|
| 10,657,259 B2 * | 5/2020 | Lee .................. | G06N 5/041 |
| 2019/0156183 A1 * | 5/2019 | Durham ............ | G06N 3/0472 |
| 2020/0380370 A1 * | 12/2020 | Lie ................... | G06F 7/483 |

OTHER PUBLICATIONS

Cai et al., "VIBNN: Hardware Acceleration of Bayesian Neural Networks", Mar. 2018, ACM SIGPLAN Notices vol. 53 Issue 2, pp. 476-488. (Year: 2018).*

Wang et al., "An SRAM-based implementation of a convolutional neural network", 2016, 2016 IEEE Biomedical Circuits and Systems Conference (BioCAS), pp. 560-563. (Year: 2016).*

(Continued)

*Primary Examiner* — Ying Yu Chen
(74) *Attorney, Agent, or Firm* — Alliance IP, LLC

(57) ABSTRACT

The present disclosure is directed to systems and methods for the selective introduction of low-level pseudo-random noise into at least a portion of the weights used in a neural network model to increase the robustness of the neural network and provide a stochastic transformation defense against perturbation type attacks. Random number generation circuitry provides a plurality of pseudo-random values. Combiner circuitry combines the pseudo-random values with a defined number of least significant bits/digits in at least some of the weights used to provide a neural network model implemented by neural network circuitry. In some instances, selection circuitry selects pseudo-random values for combination with the network weights based on a defined pseudo-random value probability distribution.

24 Claims, 5 Drawing Sheets

(56) References Cited

OTHER PUBLICATIONS

Szegedy, Christian, et al. "Intriguing properties of neural networks." arXiv preprint arXiv:1312.6199 (2013).
Zhang, Guoming, et al. "DolphinAttack: Inaudible voice commands." Proceedings of the 2017 ACM SIGSAC Conference on Computer and Communications Security. ACM, 2017.
Goodfellow, Ian J., Jonathon Shlens, and Christian Szegedy. "Explaining and harnessing adversarial examples." arXiv preprint arXiv:1412.6572 (2014).
Guo, Chuan, et al. "Countering Adversarial Images using Input Transformations." arXiv preprint arXiv:1711.00117 (2017).
Das, Nilaksh, et al. "Shield: Fast, Practical Defense and Vaccination for Deep Learning using JPEG Compression." arXiv preprint arXiv:1802.06816 (2018).
Dhillon, Guneet S., et al. "Stochastic activation pruning for robust adversarial defense." arXiv preprint arXiv:1803.01442 (2018).
Kannan, Harini, Alexey Kurakin, and Ian Goodfellow. "Adversarial Logit Pairing." arXiv preprint arXiv:1803.06373 (2018).
Athalye, Anish, and Ilya Sutskever. "Synthesizing robust adversarial examples." arXiv preprint arXiv:1707.07397 (2017).
Athalye, Anish, Nicholas Carlini, and David Wagner. "Obfuscated gradients give a false sense of security: Circumventing defenses to adversarial examples." arXiv preprint arXiv:1802.00420 (2018).
Carlini, Nicholas, and David Wagner. "Towards evaluating the robustness of neural networks." Security and Privacy (SP), 2017 IEEE Symposium on. IEEE, 2017.

\* cited by examiner

DEFENDING NEURAL NETWORKS BY RANDOMIZING MODEL WEIGHTS

TECHNICAL FIELD

The present disclosure relates to computer security, specifically detection and/or prevention of adversarial attacks on neural networks.

BACKGROUND

Neural networks are vulnerable to subliminal signals, "adversarial inputs" that degrade the performance of the neural network, and in extreme circumstances, permit an attacker to cause the neural network to generate a desired, incorrect, outcome. Consider a setting where a neural network model M has been trained to accept an input x and infer an output M(x), which typically represents some class to which x belongs. An adversary, given an input x can craft a perturbed input $x'=x+\delta_x$ that can fool the neural network model as coming from a class M(x') which is different than the original class M(x). In certain application, including machine vision and voice recognition it is possible to create adversarial examples that are imperceptibly close to the original inputs, i.e., $\delta_x$, is so small that a human observer cannot recognize a difference between the original benign input x and the malicious input x'. The ability to corrupt the output of a neural network may detrimentally impact the ability of the neural network to provide consistent results. Such may cause significant health and safety concerns where such neural networks are used in control systems, such as in autonomous vehicles.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
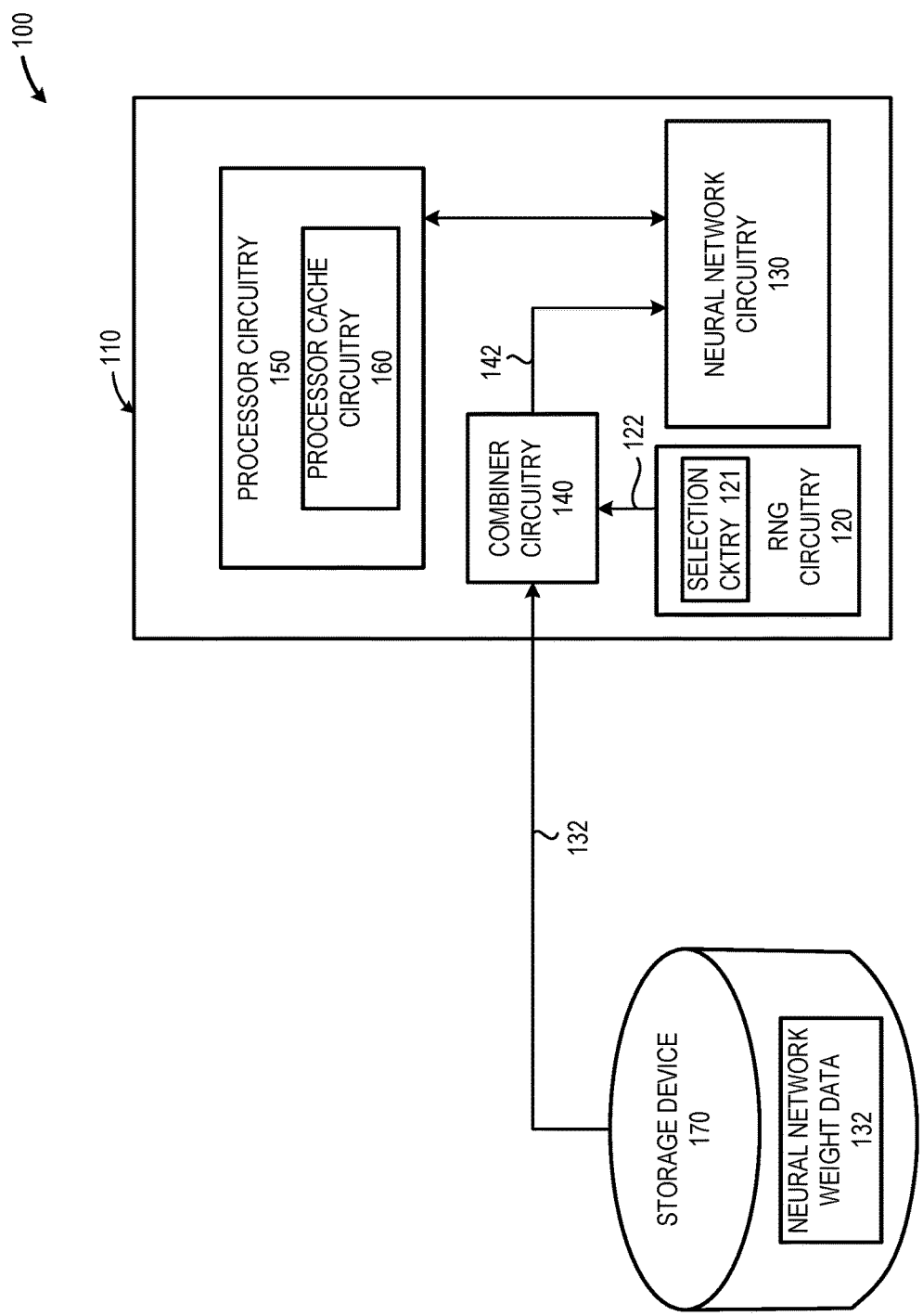
FIG. 1 provides a high level block diagram of an illustrative system that includes a central processing unit (CPU) capable of implementing a stochastic transformation defense using a random number generator circuit to replace a defined number of the least significant mantissa bits of each of a plurality of neural network node weights with a respective random noise value, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Adversarial machine learning is an active field with numerous defenses proposed in recent years, and many have proven inadequate. In adversarial training, a model M may be trained by incorporating adversarial inputs during the initial training of the network. Given a training dataset consisting of inputs $x_1, x_2, \ldots, x_n$, adversarial training expands the input set by creating k perturbed inputs for each input in the dataset, and training M using the expanded dataset. As a result, this process leads to models that have smoother decision boundaries and require relatively greater magnitude perturbations to fool than networks trained using datasets without perturbed values.

Another form of defense includes application of input pre-processing during training and inference. An example of such pre-processing in the context of computer vision is the application of JPEG compression to neural network model inputs. The thought being that JPEG compression is a non-differentiable layer added to the neural network, making it more difficult for adversaries to apply gradient-descent-based optimization techniques and obtain adversarial inputs.

Application of a stochastic transformation either to the inputs of a neural network or to the model parameters (i.e., weights) of the neural network provides another form of defense. Stochastic activation pruning is an example of such a defense. In stochastic activation pruning, neurons in the network are randomly dropped according to a probability that depends upon the absolute value of the neuron. The noise introduced by dropping neurons from the network changes the gradient through the neural network on every invocation of the model, thereby causing attack algorithms to incorrectly estimate the gradient directions and thereby fail to generate effective adversarial inputs.

Existing defenses may be combined to create an ensemble of defenses where an input of x is passed through multiple different models $M_1, M_2, \ldots, M_m$, and the final decision of the ensemble is taken after considering the outputs of individual models using some kind of aggregate selection mechanism, such as majority vote. The concept being that this increases the difficulty for adversaries to fool the ensemble because of the need to fool multiple models with the same malicious input.

Although adversarial training is considered a state-of-the-art defense, it incurs huge training overhead. The overhead is increased for several reasons. First, creating high-quality adversarial inputs is inherently time consuming and costly. Second, adversarial training entails the creation of several adversarial inputs for every one of possibly millions of benign inputs taken from the training dataset. In addition, at times, adversarial training has been found to decrease the overall accuracy of a neural network.

The systems and methods disclosed herein provide a stochastic transformation defense by adding small magnitude random noise to the node weights associated with a neural network model. This small magnitude random noise affects the lower mantissa bits of the model weights. This random noise may be introduced at any point, including: prior to deployment of the neural network in a production environment; after training with traditional methods that do not involve hardening against adversarial inputs; or at run-time once the trained model is in use. The seed used to generate the random values is maintained in secret by the owner of the model to prevent an attacker from gaining access to the lower randomized mantissa bits of the weights under the proposed defense. The randomized lower mantissa bits reside only inside the matrix multiplier circuits that implement the neural network. In this manner, a defense is in place even when the most significant mantissa bits are accessible in memory. Beneficially, this technique may be used in a neural network ensemble whose parameters have been perturbed with different noise values.

The systems and methods described herein provide several benefits. First, parameter randomization provides greater efficiency than adversarial training and input pre-processing because there is no overhead encountered during the training of the neural network and any inference overhead represents a relatively small one-time setup cost. Second, randomized models should be harder to fool than models using other stochastic transformations because the random seed and the choice of noise distribution are maintained in secret by the network owner, thereby increasing the difficulty in performing expectation over transformation attacks. Third, parameter randomization is amenable to optimized hardware implementations, for example by using a hardware random number generator to provide the random lower mantissa bits. Fourth, parameter randomization does not affect the training procedure for the neural network which is typically controlled by the end user of the network, thereby making centralized hardening possible while still providing the end user the ability to select the randomizer seed—improving security.

A neural network includes a number of layers, each layer including at least one neuron. Typically, a neuron applies a transformation on one or more inputs and produces one or more outputs. The transformation applied by each neuron includes two components: (1) a weighted linear part; and. (2) an activation function. The activation function is typically a non-linear function applied on the output of the weighted linear part and usually includes a pass/no pass filter based on whether the linear combination of inputs is greater than or equal to zero. The following function defines a neuron's output a as:

$$a = g(\Sigma_{i=0}^{k} w_i * x_i + b) \qquad (1)$$

Where k is the number of inputs, $x_i$ in the i-th input, g is the activation function, $w_i$ is the weight of the linear transformation that corresponds to input $x_i$, and b is a bias value that shifts the output of the linear transformation, $w_i$ and b are referred to as the parameters of the neuron.

Neural networks are directed to an acyclic graph of neurons, with the output of certain neurons connected to the inputs of other neurons, thereby forming a layered architecture. The inputs provided to the first layer are typically samples drawn from the data distribution being analyzed and their values are propagated and transformed through the network to produce a set of outputs. If the goal of the neural network is classification, the output is typically a set of probability values determining the likelihood that the input belongs to a particular class within a set of classes applied to the input data distribution.

Prior to commissioning a neural network, values must be assigned to the parameters a and b for each neuron such that the completed neural network reliably, predictably, and consistently predicts the class of any given input. Achieving such reliability, predictability, and consistency begin with training the neural network. Training involves collecting one or more sets of input samples and progressively adjusting parameters of some or all of the neurons until the network manages to correctly classify an acceptable number of input samples. The goal being that with sufficient training samples representative of the expected input distribution, the trained neural network will generalize its ability to classify input data across the entire input distribution.

After training, the neural network is prepared for use in the service for which the network has been trained. This phase is referred to as "inference" and includes using the model to classify new, previously unseen, inputs and making decisions based upon the model's output.

A neural network defense system is provided. The system may include: random number generation circuitry to generate pseudo-random values between a defined first boundary value and a defined second boundary value responsive to receipt of an initial seed value; and combiner circuitry coupled to the random number generation circuitry, the combiner circuitry to combine each of a plurality of weights associated with a trained neural network model with a respective one of a plurality of pseudo-random values to provide a plurality of stochastic neural network weight values; wherein each of the plurality of stochastic neural network weight values have a defined number of randomized least significant mantissa bits/digits.

A neural network defense method is provided. The method may include: generating, by random number generation circuitry, a plurality of pseudo-random values between a defined first boundary value and a defined second boundary value responsive to receipt of an initial seed value; and combining, by combiner circuitry coupled to the random number generation circuitry, each of a plurality of weights associated with a trained neural network model with a respective one of the plurality of pseudo-random values to provide a plurality of stochastic neural network weight values; where each of the plurality of stochastic neural network weight values have a defined number of randomized least significant mantissa bits/digits.

A non-transitory storage device is provided. The non-transitory storage device may include instructions that, when executed by processor circuitry, cause the processor circuitry to: generate a plurality of pseudo-random values between a defined first boundary value and a defined second boundary value responsive to receipt of an initial seed value; and combine each of a plurality of weights associated with a trained neural network model with a respective one of the plurality of pseudo-random values to provide a plurality of stochastic neural network weight values; wherein each of the plurality of stochastic neural network weight values have a defined number of randomized least significant mantissa bits/digits.

A neural network defense system is provided. The system may include: means for generating a plurality of pseudo-random values between a defined first boundary value and a defined second boundary value responsive to receipt of an initial seed value; and means for combining each of a plurality of weights associated with a trained neural network model with a respective one of the plurality of pseudo-random values to provide a plurality of stochastic neural network weight values; where each of the plurality of stochastic neural network weight values have a defined number of randomized least significant mantissa bits/digits.

An electronic device is provided. The electronic device may include: processor circuitry; a storage device to store a plurality of weights associated with a trained neural network model; random number generation circuitry to generate pseudo-random values between a defined first boundary value and a defined second boundary value responsive to receipt of an initial seed value; and combiner circuitry coupled to the random number generation circuitry, the combiner circuitry to combine each of a plurality of weights associated with a trained neural network model with a respective one of a plurality of pseudo-random values to provide a plurality of stochastic neural network weight values; where each of the plurality of stochastic neural network weight values have a defined number of randomized least significant mantissa bits/digits.

As used herein, the term "on-chip" or elements, components, systems, circuitry, or devices referred to as "on-chip" include such items integrally fabricated with the processor circuitry (e.g., a central processing unit, or CPU, in which the "on-chip" components are included, integrally formed, and/or provided by CPU circuitry) or included as separate components formed as a portion of a multi-chip module (MCM) or system-on-chip (SoC).

As used herein the terms "about" or "approximately" when used to prefix an enumerated value should be interpreted to indicate a value that is plus or minus 15% of the enumerated value. Thus, a value that is listed as "about 100" or "approximately 100%" should be understood to represent a value that could include any value or group of values between 85 (i.e., −15%) to 115 (i.e., +15%).

FIG. 1 provides a high level block diagram of an illustrative system 100 that includes a central processing unit (CPU) 110 capable of implementing a stochastic transformation defense using a random number generator circuit 120 to replace a defined number of the least significant mantissa bits of each of a plurality of neural network node weights 132A-132n (collectively, "weights 132") with a respective random noise value 122A-122n (collectively, "random noise values 122"), in accordance with at least one embodiment described herein. In embodiments, one or more storage devices 150 coupled to the CPU 110 may store, contain, or otherwise retain information and/or data associated with the weights 132 that define the model implemented by the neural network circuitry 130. In embodiments, the random number generator circuit 120 generates a random noise value 122A-122n that is used to replace a defined number of the least significant mantissa bits of some or all of the weights 132A-132n. In neural networks having multiple intermediate/hidden layers, the introduction of random noise values may occur in some or all of the intermediate/hidden layers. Beneficially, by replacing a defined number of the least significant mantissa bits in some or all of the weights 132A-132n, the accuracy of the neural network circuit 130 is minimally impacted while the robustness of the neural network 130 to adversarial attacks is significantly improved.

As depicted in FIG. 1, as the weights 132A-132n are transferred from the storage device 150 to the neural network circuitry 130, the random number generator circuit 120 generates a pseudo-random number that provides a random noise value 122A-122n. Each of the random noise values 122A-122n is then used to replace the defined number of least significant mantissa bits of a respective one of the weights 132A-132n. In embodiments, the random noise values 122 may replace the least significant mantissa bits of the weights 132 upon each instantiation of the network in the neural network circuitry 130. In embodiments, the random noise values 122 may replace the least significant mantissa bits of the weights 132 on a periodic basis after a defined number of instantiations of the network in the neural network circuitry 130. In embodiments, the random noise values 122 may replace the least significant mantissa bits of the weights 132 at random instantiation intervals of the network in the neural network circuitry 130.

In embodiments, the CPU 110 may include but is not limited to: random number generator circuitry 120, neural network circuitry 130, combiner circuitry 140, processor circuitry 150, and processor cache circuitry 160. In embodiments, the processor circuitry 150 may provide all or a portion of the random number generator circuitry 120 and/or the neural network circuitry 130. In embodiments, the neural network circuitry 130 may be implemented in processor cache circuitry 160 as an in-memory neural network 130. Example CPUs 110 may include, but are not limited to, microprocessors such as Intel Pentium® microprocessor, Intel Core™ Duo processor, Intel Core i3, Intel Core i5, Intel Core i7, AMD Athlon™ processor, AMD Turion™ processor, AMD Sempron™, AMD Ryzen® processor, and ARM Cortex® processors.

The random number generator circuitry 120 includes any number and/or combination of currently available and/or future developed electrical components, semiconductor devices, and/or logic elements capable of generating a sequence of values corresponding to random numbers based on receipt of an initial seed value by the neural network circuitry 130. In embodiments, the random number generator circuitry 120 includes selection circuitry 121 used to select random values forming a probability distribution function. Nonlimiting examples of such probability distribution functions that provide a random noise value (Y) 122 having a defined distribution include but are not limited to a Uniform Distribution, a Gaussian Distribution, or a Laplacian Distribution given by:

$$\text{Uniform: } Y \sim U_{a,b} \text{ where } PDF \text{ of } U_{a,b} \text{ is } f(x) = \frac{1}{(a-b)} \text{ if} \quad (2)$$

$x \in [a, b]$ and 0 otherwise $$\text{Gaussian: } Y \sim N_{\mu,\sigma} \text{ where} \quad (3)$$

$$PDF \text{ of } N_{\mu,\sigma} \text{ is } f(x) = \frac{1}{\sqrt{2\pi\sigma^2}} e^{-\frac{(x-\mu)^2}{2\sigma^2}}$$

$$\text{Laplacian: } Y \sim L_{\mu,b} \text{ where } PDF \text{ of } L_{\mu,b} \text{ is } f(x) = \frac{1}{2b} e^{-\frac{|x-\mu|}{b}} \quad (4)$$

The scale factors used by the selection circuitry 121 for each of the above distributions may be empirically determined during testing and/or training of the neural network. In embodiments, a scale parameter may be selected such that the magnitude of the modified random noise value 142 produced by the combiner circuitry 140 is relatively small and the neural network model evaluated using a set of benign training data. If the performance of the neural network circuitry 130 is acceptable, the scale parameters are adjusted to increase the modified random noise value 142 produced by the combiner circuitry 140 and the neural network model is again evaluated using a set of benign training data. This process to determine appropriate scale parameters may be repeated until the performance of the neural network circuitry 130 falls below a predetermined performance threshold. For example, the scale parameters may be increased any number of times until the performance of the neural network circuitry 130 falls below a performance threshold of an accuracy of: about 99% or greater; about 97% or greater; about 95% or greater; about 93% or greater; about 85% or greater; about 80% or greater; or about 75% or greater.

The random number generator circuitry 120 generates a random noise value 122 between a lower boundary limit $122_{lower}$ and an upper boundary limit $122_{upper}$. The random noise value 122 may replace any number of least significant mantissa bits. For example, the random noise value 122 may replace: a single least significant mantissa bit, 2 or fewer least significant mantissa bits; 3 or fewer least significant mantissa bits; 4 or fewer least significant mantissa bits; 5 or fewer least significant mantissa bits; 8 or fewer least significant mantissa bits; or 12 or fewer least significant mantissa bits.

The neural network circuitry 130 includes any number and/or combination of currently available and/or future developed electrical components, semiconductor devices, and/or logic elements capable of implementing a multi-layer neural network. The neural network circuitry 130 includes circuitry to receive input data from one or more sources (e.g., circuitry providing a first, input, layer of the neural network); circuitry to implement any number of hidden or intermediate neural network layers; and circuitry providing a final, output, layer of the neural network. The neural network circuitry 130 may implement any number and/or type of neural network including but not limited to: a feed forward neural network (FF), a radial basis neural network (RBF), a deep feed forward neural network (DFF), a recurrent neural network (RNN), a gated recurrent unit neural network (GRU), an auto encoder neural network (AE), a variational auto encoder neural network (VAE), a denoising auto encoder neural network (DAE), a sparse auto encoder neural network (SAE), a Markov chain neural network (MC), a Hopfield network neural network (HN), a Boltzmann machine neural network (BM), a restricted Boltzmann machine neural network (RBM), a deep belief neural network (DBN), a deep convolution neural network (DCN), a deconvolutional neural network (DN), a deep convolution inverse graphics neural network (DCIGN), a generative adversarial neural network (GAN), a liquid state machine neural network (LSM), an extreme learning machine neural network (ELM), an echo state neural network (ESN), a deep residual neural network (DRN), a Kohonen neural network (KN), a support vector machine neural network (SVM), and/or a neural Turing machine neural network (NTM).

The combiner circuitry 140 includes any number and/or combination of currently available and/or future developed electrical components, semiconductor devices, and/or logic elements capable of altering, changing, combining, and/or replacing a defined number of least significant mantissa bits on each of the weights 132A-132n with a respective random noise value 122A-122n provided by the random number generator circuitry 120. In embodiments, for each weight (w) 132, the combiner circuitry 140 determines a modified weight value ($\tilde{w}$)142. In embodiments, the modified weight value 142 may be determined as follows:

$$\tilde{w} = \text{trunc}(w, l) + Y \quad (5)$$

Where trunc(w, l) represents a function that truncates (or rounds) a defined number (l) of mantissa bits of the weight 132, and Y represents the random noise value 132 determined using a probability distribution (such as the Uniform, Gaussian, or Laplacian distributions given by equations (2), (3), or (4) above) by the random number generator circuitry 120.

The processor circuitry 150 may include any number and/or combination of electrical components, semiconductor devices, and/or logic elements capable of reading and executing machine-readable instruction sets. In embodiments, the processor circuitry 150 may include any number and/or combination of any currently available and/or future developed processors, microprocessors, controllers, and similar. In embodiments, the processor circuitry 150 may include circuitry capable of performing some or all of: fetching instructions, decoding the instructions, scheduling the instructions for execution, and executing some instructions while speculatively executing other instructions. In embodiments, the processor circuitry 150 may include one or more single- or multi-thread cores.

The processor cache circuitry 160 may include any number and/or combination of electrical components, semiconductor devices, and/or logic elements capable of non-persistently storing digital information and/or data. In embodiments, all or a portion of the processor cache circuitry 160 may be communicably coupled to a single processor circuit 150. In other embodiments, all or a portion of the processor cache circuitry 160 may be shared between multiple processor circuits 150A-150n. In embodiments, the cache processor circuitry 160 may store information and/or data as a cache line, for example, as a 64-byte cache line.

Figure 2:
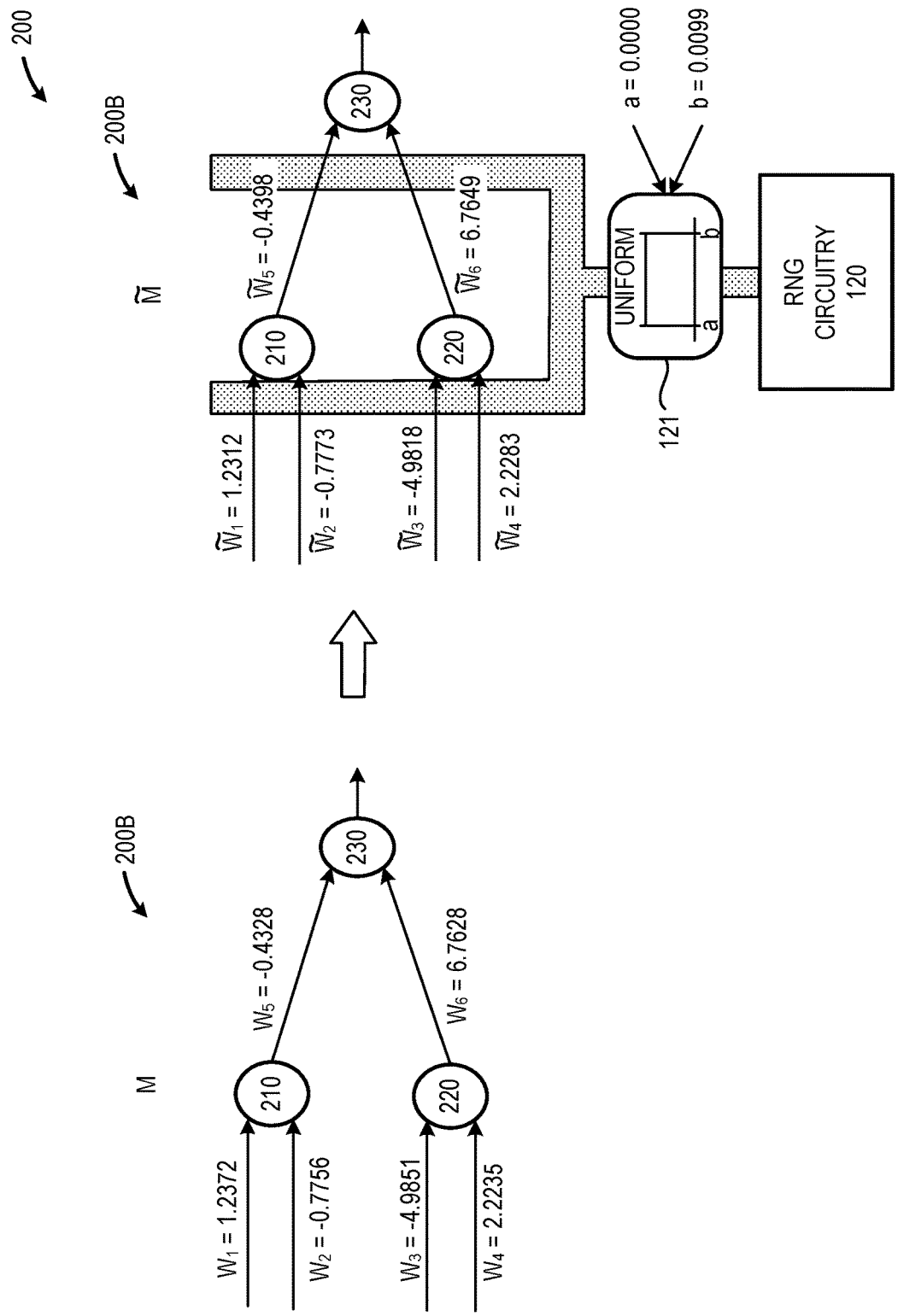
FIG. 2 is a schematic diagram of an illustrative system that compares a base system in which random noise values are not added to the weights to a stochastically modified system in which random noise values are added to the weights to provide outputs in which the two least significant bits/digits have been replaced with random, uniformly distributed values between a lower limit a and an upper limit b, in accordance with at least one embodiment described herein.

FIG. 2 is a schematic diagram of an illustrative system 200 that compares a base system 200A in which random noise values 122 are not added to the weights 132 to a stochastically modified system 200B in which random noise values 122 are added to the weights 132 to provide outputs in which the two least significant bits/digits have been replaced with random, uniformly distributed values between a lower limit a and an upper limit b, in accordance with at least one embodiment described herein. Referring first to base system 200A, the inputs $W_1$ and $W_2$ to neuron 210 and inputs $W_3$ and $W_4$ to neuron 220 are precise to four significant bits/digits. Similarly, the output $W_5$ provided by neuron 210 and the output $W_6$ provided by neuron 220 are precise to four significant bits/digits. Neuron 230 receives the output $W_5$ from neuron 210 and the output $W_6$ from neuron 220 performs one or more operations using $W_5$ and $W_6$ to provide an output value.

Referring next to modified system 200B, the random number generator circuitry 120 generates random noise outputs 122A-122n having a uniform distribution between a lower limit of a (0.0000) and an upper limit of b (0.0099). Compared to the base system 200A, in modified system 200B the two least significant bits/digits of each input value ($\tilde{W}_1$, $\tilde{W}_2$, $\tilde{W}_3$, and $\tilde{W}_4$) have been randomized using a random noise value 122A-122n generated by the random number generator circuitry 120. Comparing the modified inputs $\tilde{W}_1$ and $\tilde{W}_2$ with the unmodified inputs $W_1$ and $W_2$—it can be observed that the least significant bits/digits of $W_1$ and $W_2$ have been adjusted using uniformly distributed random noise values 122 to provide the modified inputs $\tilde{W}_1$ and $\tilde{W}_2$. For example, the unmodified input $W_1$ has a value of 1.2372 while the modified input $\tilde{W}_1$ has a value of 1.2312, a change (−0.0060) in the two least significant bits/digits attributable to the introduction of a random noise value 122 provided by the random number generator circuitry 120. Similar adjustments occur in the two least significant bits/digits of inputs $W_2$, $W_3$, and $W_4$. Similarly, the two least significant bits of outputs $\tilde{W}_5$ and $\tilde{W}_6$ have been adjusted using uniformly distributed random noise values 122. Neuron 230' receives the output $\tilde{W}_5$ from neuron 210' and the output $\tilde{W}_6$ from neuron 220' performs one or more operations using $\tilde{W}_5$ and $\tilde{W}_6$ to provide an output value.

Figure 3:
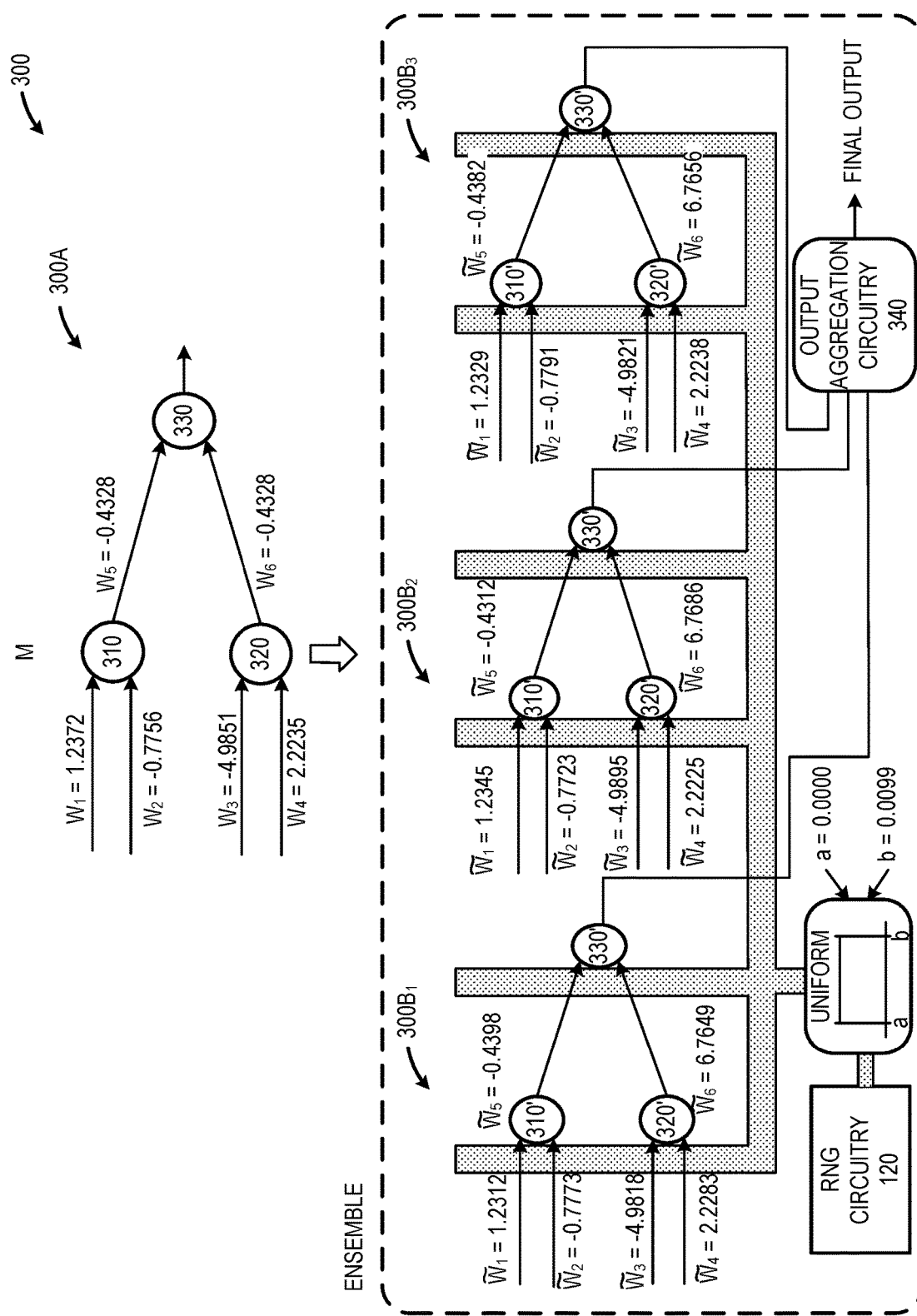
FIG. 3 is a schematic diagram of an illustrative system that compares a base system in which random noise values are not added to the weights to a stochastically modified system that includes a neural network ensemble containing three neural networks in which random noise values are added to the weights to provide outputs in which the two least significant bits/digits have been replaced with random, uniformly distributed values between a lower limit a and an upper limit b, in accordance with at least one embodiment described herein.

FIG. 3 is a schematic diagram of an illustrative system 300 that compares a base system 300A in which random noise values 122 are not added to the weights 132 to a stochastically modified system 300B that includes a neural network ensemble containing three neural networks $300B_1$, $300B_2$, and $300B_3$ in which random noise values 122 are added to the weights 132 to provide outputs in which the two least significant bits/digits have been replaced with random, uniformly distributed values between a lower limit a and an upper limit b, in accordance with at least one embodiment described herein. Referring first to base system 300A, the inputs $W_1$ and $W_2$ to neuron 310 and inputs $W_3$ and $W_4$ to neuron 320 are precise to four significant bits/digits. Similarly, the output $W_5$ provided by neuron 310 and the output $W_6$ provided by neuron 320 are precise to four significant bits/digits. Note that no stochastic modification (i.e., addition of random noise values 122) occurs to inputs $W_1$, $W_2$, $W_3$, and $W_4$ in base system 300A.

Modified system 300B includes an ensemble of three identical, stochastically modified neural networks $300B_1$, $300B_2$, and $300B_3$ in which uniformly distributed random noise values are added to the input values ($\tilde{W}_1$, $\tilde{W}_2$, $\tilde{W}_3$, and $\tilde{W}_4$) for each neural network included in the ensemble. Note that the random noise values added to each neural network $300B_1$, $300B_2$, and $300B_3$ vary and may or may not be the same. As depicted in modified system 300B, the random number generator circuitry 120 generates random noise outputs 122A-122n having a uniform distribution between a lower limit of a (0.0000) and an upper limit of b (0.0099). Compared to the base system 300A, in modified system 300B the two least significant bits/digits of each input value ($\tilde{W}_1$, $\tilde{W}_2$, $\tilde{W}_3$, and $\tilde{W}_4$) in each of the three ensemble neural networks $300B_1$, $300B_2$, and $300B_3$ have been randomized using a random noise value 122A-122n generated by the random number generator circuitry 120. Comparing the modified inputs $\tilde{W}_1$ and $\tilde{W}_2$ with the unmodified inputs $W_1$ and $W_2$—it can be observed that the two least significant bits/digits of $W_1$ and $W_2$ have been adjusted using uniformly distributed random noise values 122 to provide the modified inputs $\tilde{W}_1$ and $\tilde{W}_2$ for each of the ensemble neural networks $300B_1$, $300B_2$, and $300B_3$. For example, the unmodified input $W_1$ has a value of 1.2372 while the modified input $\tilde{W}_1$ provided to ensemble neural network $300B_1$ has a value of 1.2312 (−0.0060), the modified input $\tilde{W}_1$ provided to ensemble neural network $300B_2$ has a value of 1.2345 (−0.0027), and the modified input $\tilde{W}_1$ provided to ensemble neural network $300B_3$ has a value of 1.2329 (−0.0043), each attributable to the introduction of a random noise value 122 provided by the random number generator circuitry 120. Similar adjustments occur in the two least significant bits/digits of inputs $W_2$, $W_3$, and $W_4$. Similarly, the two least significant bits of outputs $\tilde{W}_5$ and $\tilde{W}_6$ in each of the ensemble neural networks $300B_1$, $300B_2$, and $300B_3$ reflect the impact of the uniformly distributed random noise values 122 added to the input values $\tilde{W}_1$, $\tilde{W}_2$, $\tilde{W}_3$, and $\tilde{W}_4$.

As depicted in FIG. 3, output aggregation circuitry 340 receives the output from neuron 330' in each of the ensemble neural networks $300B_1$, $300B_2$, and $300B_3$. In some embodiments, the output aggregation circuitry 340 may simply average the output values received from each of the ensemble neural networks $300B_1$, $300B_2$, and $300B_3$. In some embodiments, the output aggregation circuitry 340 may evaluate the output received from some or all of the ensemble neural networks $300B_1$, $300B_2$, and $300B_3$ to determine whether the output from each respective ensemble neural network falls within a defined, allowable, range of expected values.

Figure 4:
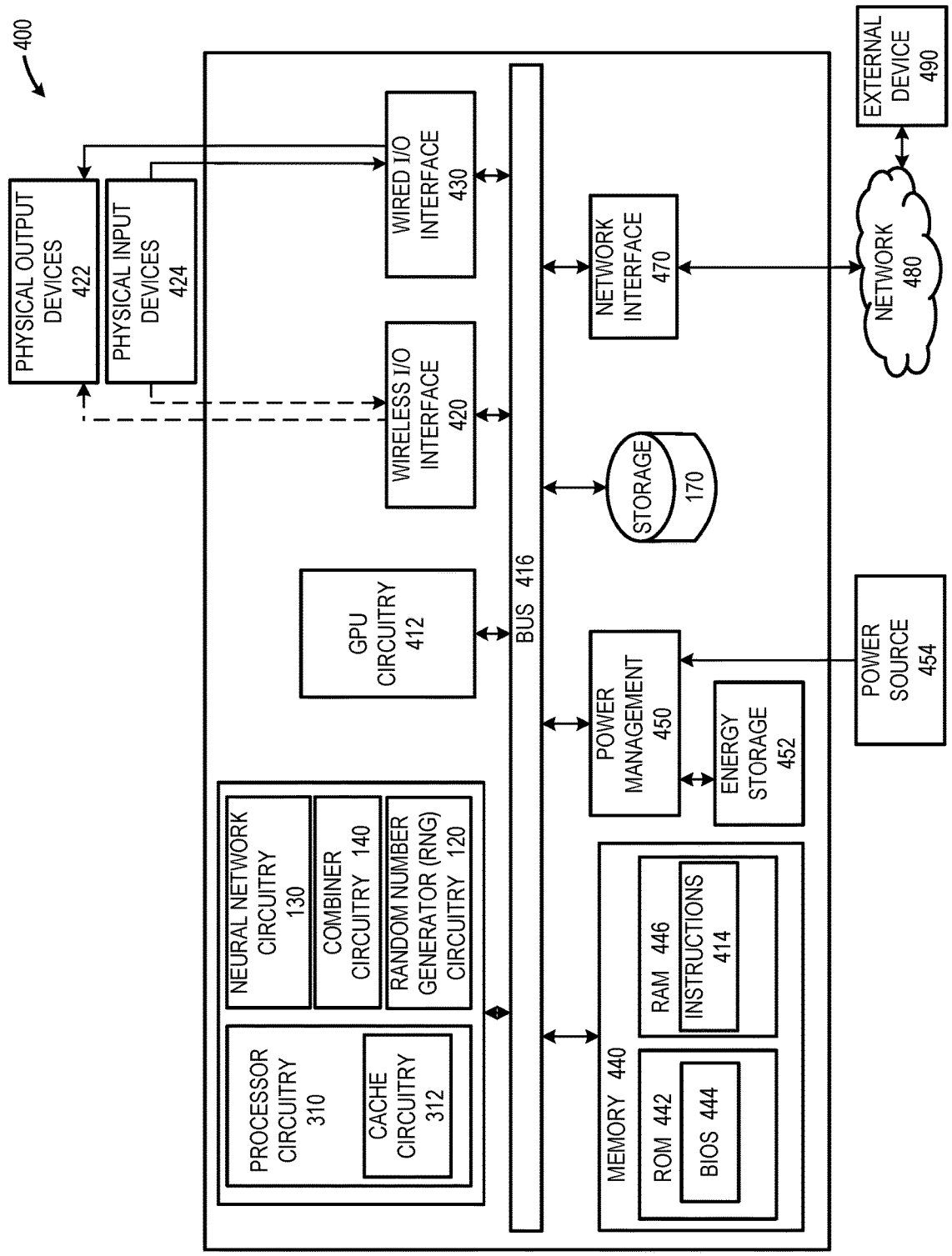
FIG. 4 is a schematic diagram of an illustrative electronic, processor-based, device that includes a CPU having random number generator circuitry, neural network circuitry, combiner circuitry, processor circuitry, and processor cache circuitry, in accordance with at least one embodiment described herein.

FIG. 4 is a schematic diagram of an illustrative electronic, processor-based, device 400 that includes a CPU 110 having random number generator circuitry 120, neural network circuitry 130, combiner circuitry 140, processor circuitry 150, and processor cache circuitry 160, in accordance with at least one embodiment described herein. The processor-based device 400 may additionally include one or more of the following: a graphical processing unit 412, a wireless input/output (I/O) interface 420, a wired I/O interface 430, main memory 440, power management circuitry 450, a non-transitory storage device 170, and a network interface 470 that may communicatively couple the processor-based device 400 to one or more external devices 490 via one or more networks 480. The following discussion provides a brief, general description of the components forming the illustrative processor-based device 400. Example, non-limiting processor-based devices 400 may include, but are not limited to: smartphones, wearable computers, portable computing devices, handheld computing devices, desktop computing devices, blade server devices, workstations, and similar.

The processor-based device 400 includes a storage device 170 that stores, contains, holds, or otherwise retains data representative of the weights 132A-132n used in the stochastic modification of the model implemented by neural network circuitry 130. Upon instantiation of the neural network by the neural network circuitry 130 weights 132 are transferred from the storage device 170 to the CPU 110. The random number generator circuitry 120 and combiner circuitry 140 combine random noise values 122A-122n with the weights 132 such that a defined number of least significant mantissa bits/digits are altered. This alteration beneficially adds a degree of randomness to the neural network implemented by the neural network circuitry 130 thereby improving the robustness of the neural network to an adversarial attack that seeks to maliciously corrupt the output of the neural network through the introduction of noise into the neural network.

In some embodiments, the processor-based device 400 includes graphics processing unit (GPU) circuitry 412 capable of executing machine-readable instruction sets 414 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 150 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 400 includes a bus or similar communications link 416 that communicably couples and facilitates the exchange of information and/or data between various system components including the processor circuitry 150, the GPU circuitry 412, the one or more wireless I/O interfaces 420, the one or more wired I/O interfaces 430, the system memory 440, one or more storage devices 170, and/or one or more network interfaces 470. The processor-based device 400 may be referred to in the singular herein, but this is not intended to limit the embodiments to a single processor-based device 400, since in certain embodiments, there may be more than one processor-based device 400 that incorporates, includes, or contains any number of communicably coupled, collocated, or remote networked circuits or devices.

The processor circuitry 150 may include any number, type, or combination of currently available or future developed devices capable of executing machine-readable instruction sets. The CPU 110 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components of the processor-based device 400 may employ any currently available or future developed serial or parallel bus structures or architectures.

The system memory 440 may include read-only memory ("ROM") 442 and random access memory ("RAM") 446. A portion of the ROM 442 may be used to store or otherwise retain a basic input/output system ("BIOS") 444. The BIOS 444 provides basic functionality to the processor-based device 400, for example by causing the processor circuitry 120 to load and/or execute one or more machine-readable instruction sets 414. In embodiments, at least some of the one or more machine-readable instruction sets 414 cause at least a portion of the processor circuitry 120 to provide, create, produce, transition, and/or function as a dedicated, specific, and particular machine, for example a word processing machine, a digital image acquisition machine, a media playing machine, a gaming system, a communications device, a smartphone, or similar.

The processor-based device 400 may include at least one wireless input/output (I/O) interface 420. The at least one wireless I/O interface 420 may be communicably coupled to one or more physical output devices 422 (tactile devices, video displays, audio output devices, hardcopy output devices, etc.). The at least one wireless I/O interface 420 may communicably couple to one or more physical input devices 424 (pointing devices, touchscreens, keyboards, tactile devices, etc.). The at least one wireless I/O interface 420 may include any currently available or future developed wireless I/O interface. Example wireless I/O interfaces include, but are not limited to: BLUETOOTH®, near field communication (NFC), and similar.

The processor-based device 400 may include one or more wired input/output (I/O) interfaces 430. The at least one wired I/O interface 430 may be communicably coupled to one or more physical output devices 422 (tactile devices, video displays, audio output devices, hardcopy output devices, etc.). The at least one wired I/O interface 430 may be communicably coupled to one or more physical input devices 424 (pointing devices, touchscreens, keyboards, tactile devices, etc.). The wired I/O interface 430 may include any currently available or future developed I/O interface. Example wired I/O interfaces include, but are not limited to: universal serial bus (USB), IEEE 1394 ("FireWire"), and similar.

The processor-based device 400 may include one or more communicably coupled, non-transitory, data storage devices 170. The data storage devices 170 may include one or more hard disk drives (HDDs) and/or one or more solid-state storage devices (SSDs). The one or more data storage devices 170 may include any current or future developed storage appliances, network storage devices, and/or systems. Non-limiting examples of such data storage devices 170 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 170 may include one or more removable storage devices, such as one or more flash drives, flash memories, flash storage units, or similar appliances or devices capable of communicable coupling to and decoupling from the processor-based device 400.

The one or more data storage devices 170 may include interfaces or controllers (not shown) communicatively coupling the respective storage device or system to the bus 416. The one or more data storage devices 170 may store, retain, or otherwise contain machine-readable instruction sets, data structures, program modules, data stores, databases, logical structures, and/or other data useful to the processor circuitry 150 and/or GPU circuitry 412 and/or one or more applications executed on or by the processor circuitry 150 and/or GPU circuitry 412. In some instances, one or more data storage devices 170 may be communicably coupled to the processor circuitry 150, for example via the bus 416 or via one or more wired communications interfaces 430 (e.g., Universal Serial Bus or USB); one or more wireless communications interfaces 420 (e.g., Bluetooth®, Near Field Communication or NFC); and/or one or more network interfaces 470 (IEEE 802.3 or Ethernet, IEEE 802.11, or WiFi®, etc.).

Processor-readable instruction sets 414 and other programs, applications, logic sets, and/or modules may be stored in whole or in part in the system memory 440. Such instruction sets 414 may be transferred, in whole or in part, from the one or more data storage devices 170. The instruction sets 414 may be loaded, stored, or otherwise retained in system memory 440, in whole or in part, during execution by the processor circuitry 150 and/or GPU circuitry 412. The processor-readable instruction sets 414 may include machine-readable and/or processor-readable code, instructions, or similar logic capable of causing the processor circuitry 150 to implement the neural network circuitry 130 at least partially within the processor circuitry 150 and/or the processor cache circuitry 160.

The processor-based device 400 may include power management circuitry 450 that controls one or more operational aspects of the energy storage device 452. In embodiments, the energy storage device 452 may include one or more primary (i.e., non-rechargeable) or secondary (i.e., rechargeable) batteries or similar energy storage devices. In embodiments, the energy storage device 452 may include one or more supercapacitors or ultracapacitors. In embodiments, the power management circuitry 450 may alter, adjust, or control the flow of energy from an external power source 454 to the energy storage device 452 and/or to the processor-based device 400. The power source 454 may include, but is not limited to, a solar power system, a commercial electric grid, a portable generator, an external energy storage device, or any combination thereof.

For convenience, the processor circuitry 150, the GPU circuitry 412, the wireless I/O interface 420, the wired I/O interface 430, the power management circuitry 450, the storage device 170, and the network interface 470 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In another example, one or more of the above-described components may be integrated into the processor circuitry 150 and/or the GPU circuitry 412. In some embodiments, all or a portion of the bus 416 may be omitted and the components are coupled directly to each other using suitable wired or wireless connections.

Figure 5:
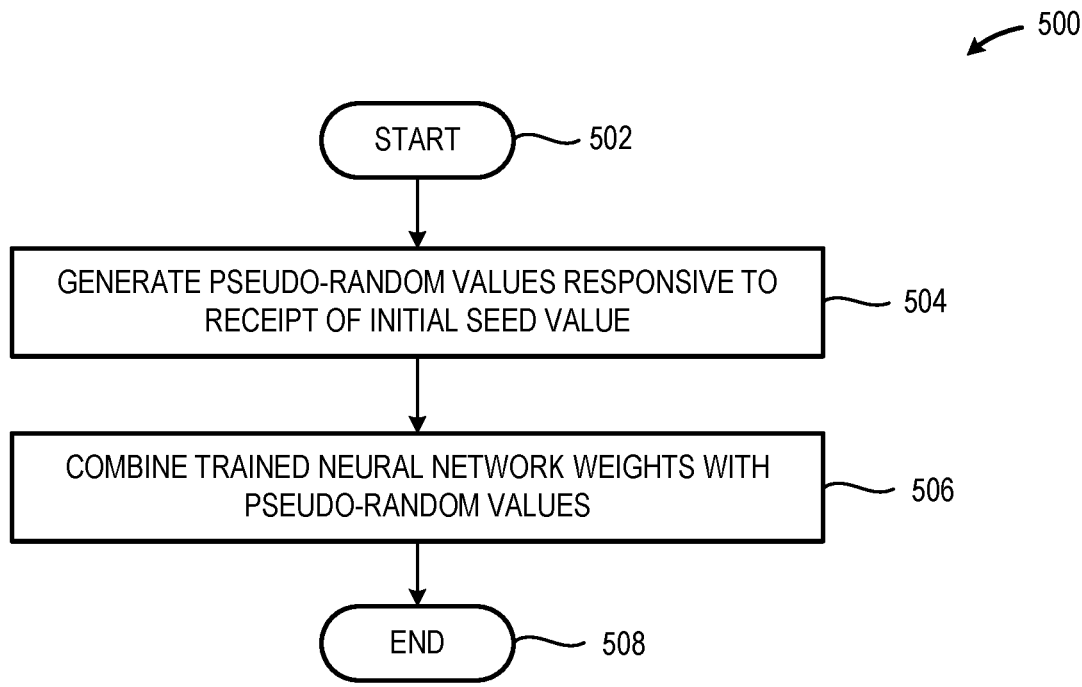
FIG. 5 is a high-level flow diagram of an illustrative method of defending a neural network by introducing a pseudo-random noise value to at least a portion of a plurality of weights to provide a plurality of stochastic weight values that form model for implementation by neural network circuitry, in accordance with at least one embodiment described herein.

FIG. 5 is a high-level flow diagram of an illustrative method 500 of defending a neural network by introducing a pseudo-random value 122A-122n to at least a portion of a plurality of weights 132A-132n to provide a plurality of stochastic weight values 142A-142n that form model for implementation by neural network circuitry 130, in accordance with at least one embodiment described herein. Adding a small amount of randomness to the model implemented by the neural network circuitry 130 improves the robustness of the network by increasing the resistance of the network to malicious perturbation attacks that attempt to alter the network output to a state selected or determined by an adversarial party. The method 500 beneficially increases the resistance of the neural network to such an attack while not adversely affecting the performance of the neural network. The method 500 combines a pseudo-randomly generated value with one or more of the least significant bits/digits of some or all of the weights used to provide the model for the neural network circuitry 130. The method 500 commences at 502.

At 504, the random number generator circuitry 120 generates a plurality of pseudo-random values 122. In embodiments, the random number generator circuitry 120 generates the pseudo-random values 122 based on a "seed" value provided by an owner and/or operator of the processor-based device containing the neural network circuitry 130 that executes the neural network model. In embodiments, the random number generator circuitry 120 generates a plurality of pseudo-random values 122 between a lower boundary value (e.g., 0.0000) and an upper boundary value (e.g., 1.0000). In embodiments the pseudo-random values 122 generated by the random number generator circuitry 120 may be mathematically adjusted or normalized to provide pseudo-random values 122 within a desired range.

At 506, combiner circuitry 140 combines each of the pseudo-random values 122A-122n generated by the random number generator circuitry 120 with respective ones of at least a portion of the weights 132A-132n associated with the neural network model implemented by the neural network circuitry 130 to provide a plurality of stochastic neural network weight values 142A-142n. In embodiments, the combiner circuitry 140 truncates a defined number of least significant mantissa bits/digits from the weights 132A-132n and replaces the truncated bits/digits with a similar number of bits/digits provided as a pseudo-random number 122A-122n by the random number generator circuitry 120. In other embodiments, the combiner circuitry 140 may perform one or more mathematical operations on a defined number of least significant bits/digits of each of the weights 132A-132n using the pseudo-random number 122A-122n by the random number generator circuitry 120. For example, the combiner circuitry may add, subtract, divide, and/or multiply the defined number of least significant bits/digits of each of the weights 132A-132n using the pseudo-random numbers 122A-122n generated by the random number generator circuitry 120. The resultant stochastic neural network weight values 142A-142n are then used by the neural network circuitry 130 to implement the neural network model. The method 500 concludes at 508.

Figure 6:
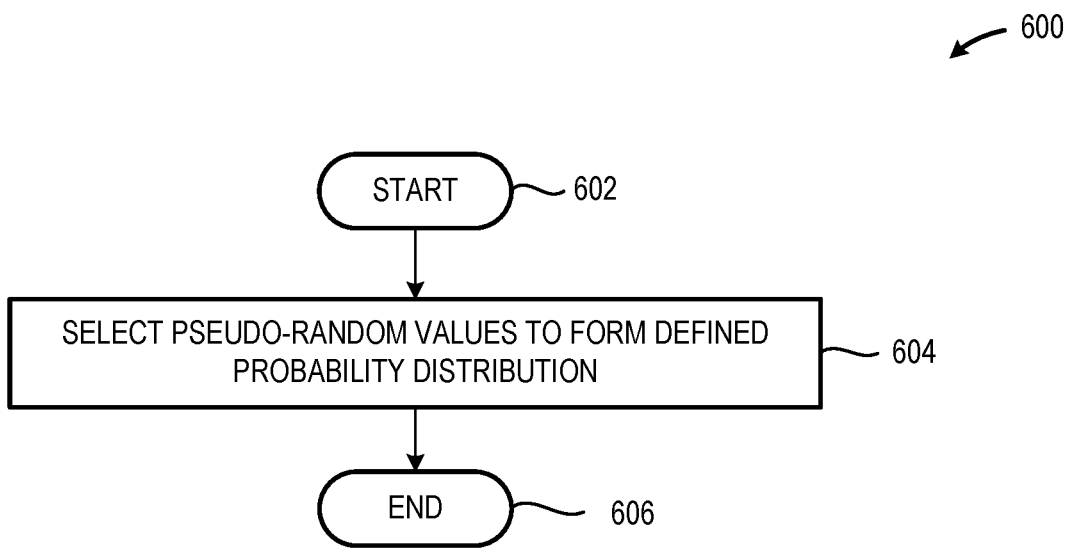
FIG. 6 is a high-level logic flow diagram of an illustrative method of selection circuitry generating a defined probability distribution using the pseudo-random values generated by the random number generator circuitry, in accordance with at least one embodiment described herein.

FIG. 6 is a high-level logic flow diagram of an illustrative method 600 of selection circuitry 121 generating a defined probability distribution using the pseudo-random values generated by the random number generator circuitry 120, in accordance with at least one embodiment described herein. In embodiments, the selection circuitry 121 may provide pseudo-random values in any defined probability distribution, such as a uniform distribution, a Gaussian distribution, or a Laplacian distribution. The method 600 commences at 602. At 604, the selection circuitry 121 receives pseudo-random values 122A-122n generated by the random number generator circuitry 120. The selection circuitry 121 also receives distribution parameter values associated with a defined probability distribution. Using the received probability distribution parameters, the selection circuitry 121 selects pseudo-random values 122A-122n within the defined probability distribution. The selected pseudo-random values 122A-122n are communicated to the combiner circuitry 140. The method 600 concludes at 606.

While FIGS. 5 and 6 illustrate various operations according to one or more embodiments, it is to be understood that not all of the operations depicted in FIGS. 5 and 6 are necessary for other embodiments. Indeed, it is fully contemplated herein that in other embodiments of the present disclosure, the operations depicted in FIGS. 5 and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for the selective introduction of low-level pseudo-random noise into at least a portion of the weights used in a neural network model to increase the robustness of the neural network and provide a stochastic transformation defense against perturbation type attacks. Random number generation circuitry provides a plurality of pseudo-random values. Combiner circuitry combines the pseudo-random values with a defined number of least significant bits/digits in at least some of the weights used to provide a neural network model implemented by neural network circuitry. In some instances, selection circuitry selects pseudo-random values for combination with the network weights based on a defined pseudo-random value probability distribution.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for the selective introduction of low-level pseudo-random noise into at least a portion of the weights used in a neural network model to increase the robustness of the neural network and provide a stochastic transformation defense against perturbation type attacks.

According to example 1, there is provided a neural network defense system. The system may include: random number generation circuitry to generate pseudo-random values between a defined first boundary value and a defined second boundary value responsive to receipt of an initial seed value; and combiner circuitry coupled to the random number generation circuitry, the combiner circuitry to combine each of a plurality of weights associated with a trained neural network model with a respective one of a plurality of pseudo-random values to provide a plurality of stochastic neural network weight values; wherein each of the plurality of stochastic neural network weight values have a defined number of randomized least significant mantissa bits/digits.

Example 2 may include elements of example 1, and the system may further include: random value selection circuitry coupled to the random number generation circuitry, the random value selection circuitry to select the plurality of pseudo-random values, such that the selected pseudo-random values form a defined distribution.

Example 3 may include elements of any of examples 1 or 2 where the random value selection circuitry provides a defined uniform distribution between a first value, a, and a second value, b; and where the first value and the second value are selected such that neural network circuitry implementing the trained neural network model maintains a correct output rate of at least 90% when using the plurality of stochastic neural network weight values.

Example 4 may include elements of any of examples 1 through 3 where the random value selection circuitry provides a defined Laplacian distribution having a defined location parameter value, $\mu$ and a defined diversity value, b; and where the defined location parameter and the defined diversity value are selected such that neural network circuitry implementing the trained neural network model maintains a correct output rate of at least 90% when using the plurality of stochastic neural network weight values.

Example 5 may include elements of any of examples 1 through 4 where the random value selection circuitry provides a defined Gaussian distribution having a defined mean value, $\mu$ and a defined standard deviation value, $\sigma$; and where the defined mean value and the defined standard deviation value are selected such that neural network circuitry implementing the trained neural network model maintains a correct output rate of at least 90% when using the plurality of stochastic neural network weight values.

Example 6 may include elements of any of examples 1 through 5 where the combiner circuitry: truncates defined number of randomized least significant mantissa bits/digits from each of the plurality of weights associated with a neural network model; and replaces the defined number of randomized least significant mantissa bits/digits with the respective one of the plurality of pseudo-random values to provide the plurality of stochastic neural network weight values.

Example 7 may include elements of any of examples 1 through 6 where the combiner circuitry mathematically combines the defined number of randomized least significant mantissa bits/digits from each of the plurality of weights associated with a neural network model with the respective one of the plurality of pseudo-random values to provide the plurality of stochastic neural network weight values.

Example 8 may include elements of any of examples 1 through 7, and the system may additionally include: input/output (I/O) interface circuitry to receive the initial seed value for the random number generation circuitry.

According to example 9, there is provided a neural network defense method. The method may include: generating, by random number generation circuitry, a plurality of pseudo-random values between a defined first boundary value and a defined second boundary value responsive to receipt of an initial seed value; and combining, by combiner circuitry coupled to the random number generation circuitry, each of a plurality of weights associated with a trained neural network model with a respective one of the plurality of pseudo-random values to provide a plurality of stochastic neural network weight values; where each of the plurality of stochastic neural network weight values have a defined number of randomized least significant mantissa bits/digits.

Example 10 may include elements of example 9 and the method may additionally include: selecting, by random value selection circuitry coupled to the random number generation circuitry, a plurality of selected pseudo-random values, such that the plurality of selected pseudo-random values forms a defined distribution.

Example 11 may include elements of any of examples 9 or 10 where selecting the plurality of selected pseudo-random values, such that the plurality of selected pseudo-random values forms the defined distribution may include: selecting, by the random value selection circuitry, the plurality of selected pseudo-random values such that the plurality of selected pseudo-random values forms a uniform distribution between a first value, a, and a second value, b; and where the first value and the second value are selected such that neural network circuitry implementing the trained neural network model maintains a correct output rate of at least 90% when using the plurality of stochastic neural network weight values.

Example 12 may include elements of any of examples 9 through 11 where selecting the plurality of selected pseudo-random values, such that the plurality of selected pseudo-random values forms the defined distribution may include: selecting, by the random value selection circuitry, the plurality of selected pseudo-random values such that the plurality of selected pseudo-random values forms a Laplacian distribution having a defined location parameter value, $\mu$ and a defined diversity value, b; and where the defined location parameter and the defined diversity value are selected such that neural network circuitry implementing the trained neural network model maintains a correct output rate of at least 90% when using the plurality of stochastic neural network weight values.

Example 13 may include elements of any of examples 9 through 12 where selecting the plurality of selected pseudo-random values, such that the plurality of selected pseudo-random values forms the defined distribution may include: selecting, by the random value selection circuitry, the plurality of selected pseudo-random values such that the plurality of selected pseudo-random values forms a defined Gaussian distribution having a defined mean value, $\mu$ and a defined standard deviation value, $\sigma$; and wherein the defined mean value and the defined standard deviation value are selected such that neural network circuitry implementing the trained neural network model maintains a correct output rate of at least 90% when using the plurality of stochastic neural network weight values.

Example 14 may include elements of any of examples 9 through 13 where combining each of a plurality of weights associated with a trained neural network model with a respective one of the plurality of pseudo-random values to provide a plurality of stochastic neural network weight values may include: truncating, by the combiner circuitry, the defined number of randomized least significant mantissa bits/digits from each of the plurality of weights associated with a neural network model; and replacing, by the combiner circuitry, the defined number of randomized least significant mantissa bits/digits with the respective one of the plurality of pseudo-random values to provide the plurality of stochastic neural network weight values.

Example 15 may include elements of any of examples 9 through 14 where combining each of a plurality of weights associated with a trained neural network model with a respective one of the plurality of pseudo-random values to provide a plurality of stochastic neural network weight values may include: mathematically combining, by the combiner circuitry, the defined number of randomized least significant mantissa bits/digits from each of the plurality of weights associated with a neural network model with the respective one of the plurality of pseudo-random values to provide the plurality of stochastic neural network weight values.

Example 16 may include elements of any of examples 9 through 15 and the method may additionally include receiving, via input/output (I/O) interface circuitry, the initial seed value for the random number generation circuitry.

According to example 17, there is provided a non-transitory storage device. The non-transitory storage device may include instructions that, when executed by processor circuitry, cause the processor circuitry to: generate a plurality of pseudo-random values between a defined first boundary value and a defined second boundary value responsive to receipt of an initial seed value; and combine each of a plurality of weights associated with a trained neural network model with a respective one of the plurality of pseudo-random values to provide a plurality of stochastic neural network weight values; wherein each of the plurality of stochastic neural network weight values have a defined number of randomized least significant mantissa bits/digits.

Example 18 may include elements of example 17 where the instructions may further cause the processor circuitry to: select a plurality of selected pseudo-random values such that the plurality of selected pseudo-random values forms a defined distribution.

Example 19 may include elements of any of examples 17 or 18 where the instructions that cause the processor circuitry to select the plurality of selected pseudo-random values, such that the plurality of selected pseudo-random values forms the defined distribution further cause the processor circuitry to: select the plurality of selected pseudo-random values such that the plurality of selected pseudo-random values forms a uniform distribution between a first value, a, and a second value, b; where the first value and the second value are selected such that neural network circuitry implementing the trained neural network model maintains a correct output rate of at least 90% when using the plurality of stochastic neural network weight values.

Example 20 may include elements of any of examples 17 through 19 where the instructions that cause the processor circuitry to select the plurality of selected pseudo-random values, such that the plurality of selected pseudo-random values forms the defined distribution further cause the processor circuitry to: select the plurality of selected pseudo-random values such that the plurality of selected pseudo-random values forms a Laplacian distribution having a defined location parameter value, $\mu$ and a defined diversity value, b; and where the defined location parameter and the defined diversity value are selected such that neural network circuitry implementing the trained neural network model maintains a correct output rate of at least 90% when using the plurality of stochastic neural network weight values.

Example 21 may include elements of any of examples 17 through 20 where the instructions that cause the processor circuitry to select the plurality of selected pseudo-random values, such that the plurality of selected pseudo-random values forms the defined distribution further cause the processor circuitry to: select the plurality of selected pseudo-random values such that the plurality of selected pseudo-random values forms a defined Gaussian distribution having a defined mean value, $\mu$ and a defined standard deviation value, $\sigma$; and where the defined mean value and the defined standard deviation value are selected such that neural network circuitry implementing the trained neural network model maintains a correct output rate of at least 90% when using the plurality of stochastic neural network weight values.

Example 22 may include elements of any of examples 17 through 21 where the instructions that cause the processor circuitry to combine each of a plurality of weights associated with a trained neural network model with a respective one of the plurality of pseudo-random values to provide a plurality of stochastic neural network weight values further cause the processor circuitry to: truncate the defined number of least significant mantissa bits/digits from each of the plurality of weights associated with a neural network model; and replace the defined number of truncated least significant mantissa bits/digits with the respective one of the plurality of pseudo-random values to provide the plurality of stochastic neural network weight values.

Example 23 may include elements of any of examples 17 through 22 where the instructions that cause the processor circuitry to combine each of a plurality of weights associated with a trained neural network model with a respective one of the plurality of pseudo-random values to provide a plurality of stochastic neural network weight values further cause the processor circuitry to: mathematically combine the defined number of least significant mantissa bits/digits from each of the plurality of weights with the respective one of the plurality of pseudo-random values to provide the plurality of stochastic neural network weight values.

According to example 24, there is provided a neural network defense system. The system may include: means for generating a plurality of pseudo-random values between a defined first boundary value and a defined second boundary value responsive to receipt of an initial seed value; and means for combining each of a plurality of weights associated with a trained neural network model with a respective one of the plurality of pseudo-random values to provide a plurality of stochastic neural network weight values; where each of the plurality of stochastic neural network weight values have a defined number of randomized least significant mantissa bits/digits.

Example 25 may include elements of example 24, and the system may include: means for selecting a plurality of selected pseudo-random values, such that the plurality of selected pseudo-random values forms a defined distribution.

Example 26 may include elements of any of examples 24 or 25 where the means for selecting the plurality of selected pseudo-random values, such that the plurality of selected pseudo-random values forms the defined distribution may include: means for selecting the plurality of selected pseudo-random values such that the plurality of selected pseudo-random values forms a uniform distribution between a first value, a, and a second value, b; and where the first value and the second value are selected such that neural network circuitry implementing the trained neural network model maintains a correct output rate of at least 90% when using the plurality of stochastic neural network weight values.

Example 27 may include elements of any of examples 24 through 26 where the means for selecting the plurality of selected pseudo-random values, such that the plurality of selected pseudo-random values forms the defined distribution may include: means for selecting the plurality of selected pseudo-random values such that the plurality of selected pseudo-random values forms a Laplacian distribution having a defined location parameter value, $\mu$ and a defined diversity value, b; and where the defined location parameter and the defined diversity value are selected such that neural network circuitry implementing the trained neural network model maintains a correct output rate of at least 90% when using the plurality of stochastic neural network weight values.

Example 28 may include elements of any of examples 24 through 27 where the means for selecting the plurality of selected pseudo-random values, such that the plurality of selected pseudo-random values forms the defined distribution may include: means for selecting the plurality of selected pseudo-random values such that the plurality of selected pseudo-random values forms a defined Gaussian distribution having a defined mean value, $\mu$ and a defined standard deviation value, $\sigma$; and where the defined mean value and the defined standard deviation value are selected such that neural network circuitry implementing the trained neural network model maintains a correct output rate of at least 90% when using the plurality of stochastic neural network weight values.

Example 29 may include elements of any of examples 24 through 28 where the means for combining each of a plurality of weights associated with a trained neural network model with a respective one of the plurality of pseudo-random values to provide a plurality of stochastic neural network weight values may include: means for truncating the defined number of randomized least significant mantissa bits/digits from each of the plurality of weights associated with a neural network model; and means for replacing the defined number of randomized least significant mantissa bits/digits with the respective one of the plurality of pseudo-random values to provide the plurality of stochastic neural network weight values.

Example 30 may include elements of any of examples 24 through 29 where the means for combining each of a plurality of weights associated with a trained neural network model with a respective one of the plurality of pseudo-random values to provide a plurality of stochastic neural network weight values may include: means for mathematically combining the defined number of randomized least significant mantissa bits/digits from each of the plurality of weights associated with a neural network model with the respective one of the plurality of pseudo-random values to provide the plurality of stochastic neural network weight values.

Example 31 may include elements of any of examples 24 through 30 and the system may further include: means for receiving the initial seed value for the random number generation circuitry.

According to example 31, there is provided an electronic device. The electronic device may include: processor circuitry; a storage device to store a plurality of weights associated with a trained neural network model; random number generation circuitry to generate pseudo-random values between a defined first boundary value and a defined second boundary value responsive to receipt of an initial seed value; and combiner circuitry coupled to the random number generation circuitry, the combiner circuitry to combine each of a plurality of weights associated with a trained neural network model with a respective one of a plurality of pseudo-random values to provide a plurality of stochastic neural network weight values; where each of the plurality of stochastic neural network weight values have a defined number of randomized least significant mantissa bits/digits.

Example 32 may include elements of example 31, and the system may further include: random value selection circuitry coupled to the random number generation circuitry, the random value selection circuitry to select the plurality of pseudo-random values, such that the selected pseudo-random values form a defined distribution.

Example 33 may include elements of any of examples 31 or 32 where the random value selection circuitry provides a defined uniform distribution between a first value, a, and a second value, b; and where the first value and the second value are selected such that neural network circuitry implementing the trained neural network model maintains a correct output rate of at least 90% when using the plurality of stochastic neural network weight values.

Example 34 may include elements of any of examples 31 through 33 where the random value selection circuitry provides a defined Laplacian distribution having a defined location parameter value, $\mu$ and a defined diversity value, b; and where the defined location parameter and the defined diversity value are selected such that neural network circuitry implementing the trained neural network model maintains a correct output rate of at least 90% when using the plurality of stochastic neural network weight values.

Example 35 may include elements of any of examples 31 through 34 where the random value selection circuitry provides a defined Gaussian distribution having a defined mean value, $\mu$ and a defined standard deviation value, $\sigma$; and where the defined mean value and the defined standard deviation value are selected such that neural network circuitry implementing the trained neural network model maintains a correct output rate of at least 90% when using the plurality of stochastic neural network weight values.

Example 36 may include elements of any of examples 31 through 35 where the combiner circuitry: truncates defined number of randomized least significant mantissa bits/digits from each of the plurality of weights associated with a neural network model; and replaces the defined number of randomized least significant mantissa bits/digits with the respective one of the plurality of pseudo-random values to provide the plurality of stochastic neural network weight values.

Example 37 may include elements of any of examples 31 through 36 where the combiner circuitry: mathematically combines the defined number of randomized least significant mantissa bits/digits from each of the plurality of weights associated with a neural network model with the respective one of the plurality of pseudo-random values to provide the plurality of stochastic neural network weight values.

Example 38 may include elements of any of examples 31 through 37 and the electronic device may additionally include: input/output (I/O) interface circuitry to receive the initial seed value for the random number generation circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A neural network defense system, comprising:
random number generation circuitry to generate pseudo-random values between a defined first boundary value and a defined second boundary value responsive to receipt of an initial seed value;
combiner circuitry coupled to the random number generation circuitry, the combiner circuitry to combine each of a plurality of weights associated with a trained neural network model with a respective one of a plurality of pseudo-random values to provide a plurality of stochastic neural network weight values;
wherein each of the plurality of stochastic neural network weight values have a defined number of randomized least significant mantissa bits/digits; and
neural network circuitry to implement a neural network using the plurality of stochastic neural network weight values.

2. The neural network defense system of claim 1, further comprising:
random value selection circuitry coupled to the random number generation circuitry, the random value selection circuitry to select the plurality of pseudo-random values, such that the selected pseudo-random values form a defined distribution.

3. The neural network defense system of claim 2 wherein the random value selection circuitry provides a defined uniform distribution between a first value, a, and a second value, b;
wherein the first value and the second value are selected such that neural network circuitry implementing the trained neural network model maintains a correct output rate of at least 90% when using the plurality of stochastic neural network weight values.

4. The neural network defense system of claim 2 wherein the random value selection circuitry provides a defined Laplacian distribution having a defined location parameter value, $\mu$ and a defined diversity value, b;
wherein the defined location parameter and the defined diversity value are selected such that neural network circuitry implementing the trained neural network model maintains a correct output rate of at least 90% when using the plurality of stochastic neural network weight values.

5. The neural network defense system of claim 2 wherein the random value selection circuitry provides a defined Gaussian distribution having a defined mean value, µ and a defined standard deviation value, a;
   wherein the defined mean value and the defined standard deviation value are selected such that neural network circuitry implementing the trained neural network model maintains a correct output rate of at least 90% when using the plurality of stochastic neural network weight values.

6. The neural network defense system of claim 1 wherein the combiner circuitry:
   truncates the defined number of randomized least significant mantissa bits/digits from each of the plurality of weights associated with a neural network model; and
   replaces the defined number of randomized least significant mantissa bits/digits with the respective one of the plurality of pseudo-random values to provide the plurality of stochastic neural network weight values.

7. The neural network defense system of claim 1 wherein the combiner circuitry:
   mathematically combines the defined number of randomized least significant mantissa bits/digits from each of the plurality of weights associated with a neural network model with the respective one of the plurality of pseudo-random values to provide the plurality of stochastic neural network weight values.

8. The neural network defense system of claim 1, further comprising:
   input/output (I/O) interface circuitry to receive the initial seed value for the random number generation circuitry.

9. A neural network defense method, comprising:
   generating, by random number generation circuitry, a plurality of pseudo-random values between a defined first boundary value and a defined second boundary value responsive to receipt of an initial seed value;
   combining, by combiner circuitry coupled to the random number generation circuitry, each of a plurality of weights associated with a trained neural network model with a respective one of the plurality of pseudo-random values to provide a plurality of stochastic neural network weight values;
      wherein each of the plurality of stochastic neural network weight values have a defined number of randomized least significant mantissa bits/digits; and
   implementing a neural network using the plurality of stochastic neural network weight values.

10. The method network of claim 9, further comprising:
    selecting, by random value selection circuitry coupled to the random number generation circuitry, a plurality of selected pseudo-random values, such that the plurality of selected pseudo-random values forms a defined distribution.

11. The method of claim 10 wherein selecting the plurality of selected pseudo-random values, such that the plurality of selected pseudo-random values forms the defined distribution comprises:
    selecting, by the random value selection circuitry, the plurality of selected pseudo-random values such that the plurality of selected pseudo-random values forms a uniform distribution between a first value, a, and a second value, b;
       wherein the first value and the second value are selected such that neural network circuitry implementing the trained neural network model maintains a correct output rate of at least 90% when using the plurality of stochastic neural network weight values.

12. The method of claim 10 wherein selecting the plurality of selected pseudo-random values, such that the plurality of selected pseudo-random values forms the defined distribution comprises:
    selecting, by the random value selection circuitry, the plurality of selected pseudo-random values such that the plurality of selected pseudo-random values forms a Laplacian distribution having a defined location parameter value, µ and a defined diversity value, b;
       wherein the defined location parameter and the defined diversity value are selected such that neural network circuitry implementing the trained neural network model maintains a correct output rate of at least 90% when using the plurality of stochastic neural network weight values.

13. The method of claim 10 wherein selecting the plurality of selected pseudo-random values, such that the plurality of selected pseudo-random values forms the defined distribution comprises:
    selecting, by the random value selection circuitry, the plurality of selected pseudo-random values such that the plurality of selected pseudo-random values forms a defined Gaussian distribution having a defined mean value, µ and a defined standard deviation value, a;
       wherein the defined mean value and the defined standard deviation value are selected such that neural network circuitry implementing the trained neural network model maintains a correct output rate of at least 90% when using the plurality of stochastic neural network weight values.

14. The method of claim 9 wherein combining each of a plurality of weights associated with a trained neural network model with a respective one of the plurality of pseudo-random values to provide a plurality of stochastic neural network weight values comprises:
    truncating, by the combiner circuitry, the defined number of randomized least significant mantissa bits/digits from each of the plurality of weights associated with a neural network model; and
    replacing, by the combiner circuitry, the defined number of randomized least significant mantissa bits/digits with the respective one of the plurality of pseudo-random values to provide the plurality of stochastic neural network weight values.

15. The method of claim 9 wherein combining each of a plurality of weights associated with a trained neural network model with a respective one of the plurality of pseudo-random values to provide a plurality of stochastic neural network weight values comprises:
    mathematically combining, by the combiner circuitry, the defined number of randomized least significant mantissa bits/digits from each of the plurality of weights associated with a neural network model with the respective one of the plurality of pseudo-random values to provide the plurality of stochastic neural network weight values.

16. The method of claim 9, further comprising:
    receiving, via input/output (I/O) interface circuitry, the initial seed value for the random number generation circuitry.

17. A non-transitory storage device including instructions that, when executed by processor circuitry, cause the processor circuitry to:

generate a plurality of pseudo-random values between a defined first boundary value and a defined second boundary value responsive to receipt of an initial seed value; and combine each of a plurality of weights associated with a trained neural network model with a respective one of the plurality of pseudo-random values to provide a plurality of stochastic neural network weight values;
    wherein each of the plurality of stochastic neural network weight values have a defined number of randomized least significant mantissa bits/digits; and implement a neural network using the plurality of stochastic neural network weight values.

18. The non-transitory storage device of claim 17 wherein the instructions further cause the processor circuitry to:
    select a plurality of selected pseudo-random values such that the plurality of selected pseudo-random values forms a defined distribution.

19. The non-transitory storage device of claim 18 wherein the instructions that cause the processor circuitry to select the plurality of selected pseudo-random values, such that the plurality of selected pseudo-random values forms the defined distribution further cause the processor circuitry to:
    select the plurality of selected pseudo-random values such that the plurality of selected pseudo-random values forms a uniform distribution between a first value, a, and a second value, b;
        wherein the first value and the second value are selected such that neural network circuitry implementing the trained neural network model maintains a correct output rate of at least 90% when using the plurality of stochastic neural network weight values.

20. The non-transitory storage device of claim 18 wherein the instructions that cause the processor circuitry to select the plurality of selected pseudo-random values, such that the plurality of selected pseudo-random values forms the defined distribution further cause the processor circuitry to:
    select the plurality of selected pseudo-random values such that the plurality of selected pseudo-random values forms a Laplacian distribution having a defined location parameter value, and a defined diversity value, b;
        wherein the defined location parameter and the defined diversity value are selected such that neural network circuitry implementing the trained neural network model maintains a correct output rate of at least 90% when using the plurality of stochastic neural network weight values.

21. The non-transitory storage device of claim 18 wherein the instructions that cause the processor circuitry to select the plurality of selected pseudo-random values, such that the plurality of selected pseudo-random values forms the defined distribution further cause the processor circuitry to:
    select the plurality of selected pseudo-random values such that the plurality of selected pseudo-random values forms a defined Gaussian distribution having a defined mean value, $\mu$ and a defined standard deviation value, a;
        wherein the defined mean value and the defined standard deviation value are selected such that neural network circuitry implementing the trained neural network model maintains a correct output rate of at least 90% when using the plurality of stochastic neural network weight values.

22. The non-transitory storage device of claim 17 wherein the instructions that cause the processor circuitry to combine each of a plurality of weights associated with a trained neural network model with a respective one of the plurality of pseudo-random values to provide a plurality of stochastic neural network weight values further cause the processor circuitry to:
    truncate the defined number of least significant mantissa bits/digits from each of the plurality of weights associated with a neural network model; and
    replace the defined number of truncated least significant mantissa bits/digits with the respective one of the plurality of pseudo-random values to provide the plurality of stochastic neural network weight values.

23. The non-transitory storage device of claim 17 wherein the instructions that cause the processor circuitry to combine each of a plurality of weights associated with a trained neural network model with a respective one of the plurality of pseudo-random values to provide a plurality of stochastic neural network weight values further cause the processor circuitry to:
    mathematically combine the defined number of least significant mantissa bits/digits from each of the plurality of weights with the respective one of the plurality of pseudo-random values to provide the plurality of stochastic neural network weight values.

24. A neural network defense system, comprising:
a processor circuitry;
means for generating a plurality of pseudo-random values between a defined first boundary value and a defined second boundary value responsive to receipt of an initial seed value; and
means for combining each of a plurality of weights associated with a trained neural network model with a respective one of the plurality of pseudo-random values to provide a plurality of stochastic neural network weight values;
wherein each of the plurality of stochastic neural network weight values have a defined number of randomized least significant mantissa bits/digits; and
means for implementing a neural network using the plurality of stochastic neural network weight values.

* * * * *